Oct. 17, 1933.  J. L. G. MEYER  1,930,621
SECTIONAL CARRIER FOR CONVEYERS
Filed April 18, 1932
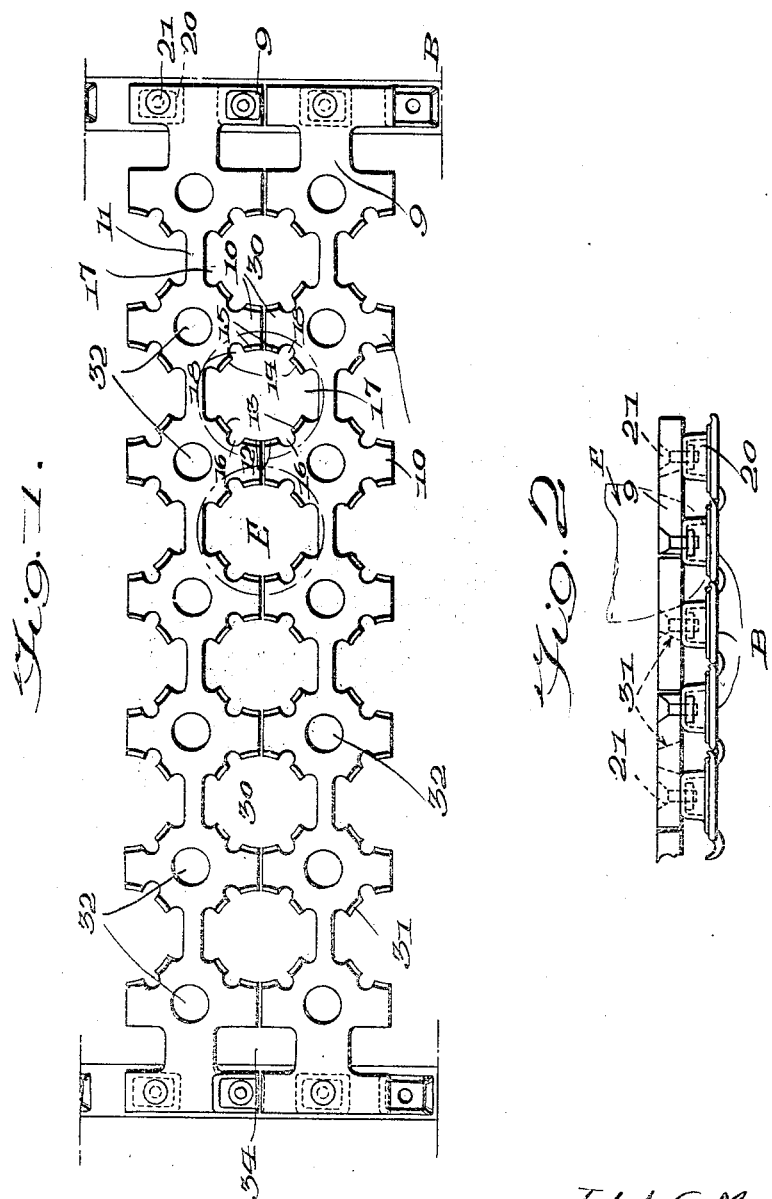

Patented Oct. 17, 1933

1,930,621

UNITED STATES PATENT OFFICE 1,930,621

SECTIONAL CARRIER FOR CONVEYERS

Job L. G. Meyer, Seattle, Wash.

Application April 18, 1932. Serial No. 605,999

7 Claims. (Cl. 198—131)

My invention relates to conveyers adapted to be used separately or as a part of an egg processing machine in the handling and conveying of eggs, and especially in connection with the operation of egg treating processes. More particularly, the invention relates to a sectional carrier for conveyers of this character adapted to support and convey eggs in upright position wherever the conveying of eggs may be necessary or desirable. One of the principal illustrative uses of my invention is in the conveying of eggs through a bath or spray of oil or other liquid commonly used in egg-processing.

Among the objects of my invention is the provision of a sectional carrier adapted to be secured to conveyer chains or belts to form a substantial tray for eggs and possessing the flexibility requisite to an efficient endless conveyer.

Another object is the provision of an egg carrier or tray for conveyers formed of removable and interchangeable sections so designed, constructed and arranged as to furnish firm and safe seat-pockets for suspending or supporting eggs in upright position and to insure access of a maximum quantity of the oil or other treating liquid to the eggs and speedy and efficient drainage of the liquid from the carrier or tray.

In the drawing,

Fig. 1 is a plan view of a portion of my sectional carrier invention applied to conveyer chains, and Fig. 2 is a side elevational view of the construction shown in Fig. 1.

My invention is capable of various modes of application and use. For example, sectional carriers in accordance with my invention may be secured to endless chains to form an endless conveyer arranged to pass over the deck and between guide rails of a processing machine of any suitable construction. Oil or other treating liquid may be supplied to the machine from an elevated tank or reservoir, and the liquid or liquids used in the processing methods, after draining from the carriers, may escape from the machine through any suitably disposed drain outlets.

The conveyer chains or belts may be of any suitable construction and driven by any suitable driving means.

The particular forms of processing machine, conveyer-supporting means, and conveyer driving means constitute no part of my invention, and for this reason are not shown in the drawing.

My invention is of general applicability, being capable of use in connection with conveyers, not only for passing eggs through or under a bath or flow of oil, but also for conveying eggs from one point to another irrespective of the presence or absence of oil or other treating liquid.

In its broadest aspects the invention is a sectional carrier or flexible tray made up of units in the form of strips, bars, or plates, each secured at its ends to parallel chains, belts, or other driven conveyer elements.

Although described particularly as a carrier or conveyer for eggs, the invention is capable of use for other articles, and particularly fruit of various kinds.

The individual carrier units 9 may be made of any suitable material, preferably of aluminum or other strong, light metal. Each unit is preferably formed of a single flat strip, plate, bar, or piece of material, and given the configuration shown in detail in Fig. 1, characterized generally by a row of spaced projections 10 extending outwardly in the same plane from each side of a central longitudinal bar 11.

Between each adjacent pair of projections 10 on each side of bar 11 there is a generally semi-circular recess, the walls of which conform substantially to arcs of a circle at 12, 13, 14, 15, but are cut away between the arcuate portions to form recesses 16, 17, 18.

When assembled, the units 9 are secured at each end, preferably removably by screw bolts 21, to alternate links 20 of chains B, the intermediate links forming a base or support for the unsecured edges or overhangs of the units. By virtue of this construction the carrier or tray sections rest upon a level foundation and lie as flat as if they were combined in one solid piece. This construction also permits free pivotal or turning movement of the units with the narrower chain links over the sprockets at the respective ends of any endless conveyer supporting frame. Sufficient clearance is provided between adjacent units 9 to permit such turning movement with the chains to which they are attached, and the adjacent edges of the units may be rounded for this purpose, if desired. This flexibility of action is important, since the breaking of each individual carrier section at the point where the chain traverses the sprocket requires comparatively little space for turning around the sprockets. Solid or integral trays or carriers require much more room for negotiating the turns and consequently much more expensive mechanism for maintaining the correct speed of the conveyer.

When assembled in operative juxtaposed relation with their ends secured to links of the conveyor chains, the recesses on each side of a unit or strip 9 register with the similar and complementary recesses of the adjacent plate or plates to form generally circular egg pockets or seats 30, in each of which an egg E may be supported in upright position upon a preferably six-point suspension which is in the form of a circle and comprises the arcuate walls 13 and 14 of each unit and the pairs of arcuate walls 12—12 and 15—15 brought together by the juxtaposition of the units 9.

To insure proper and safe seating of the eggs in the pockets the arcuate walls thereof are beveled or tapered downwardly, as at 31. This form of seat not only enables the egg to be placed in the pocket quickly and accurately, but provides for its secure retention in upright position and prevents the breaking of the egg which would be liable to occur were the walls of the pocket a complete uninterrupted circular opening in a plate with straight vertical walls.

The recesses 16, 17, and 18 intermediate the egg-suspension seats or pockets 30 provide not only increased opportunity for access of oil or other treating liquid to the surface of the egg and passage of the liquid over and around the egg, but increased facilities for drainage of the liquid from the egg and from the upper surface of the units 9 as well. For maximum rapidity and completeness of such drainage a series of additional openings 32 may be provided in each unit 9 and the end openings 34 formed by the complementary end recesses in adjacent units 9 may also be used for drainage, especially if unsuitable for egg pockets because of their proximity to the conveyer chains, or for any other reason.

The efficiency of the drainage resulting from the provision of these drainage recesses and openings is important and beneficial in that it obviates the carrying-over of any considerable amount of oil or other liquid to damage the paper separators customarily used to hold the eggs in standard cases.

I claim:

1. In a carrier for eggs, a plurality of flat plates flexibly secured together in parallel substantially abutting relation, said plates having complementary recesses forming egg pockets within the borders of abutting plates and between their adjacent side edge portions, said pockets having spaced arcuate egg engaging wall portions tapered downwardly and intermediate recesses in the walls of the pockets.

2. In a carrier for eggs, a pair of conveyer chains, a plurality of plates each having a series of recesses in each side edge portion, said plates having their ends secured to the chains and being disposed in substantially abutting parallel relation with the recesses of one plate registering with complementary recesses of an adjacent plate to form pockets for supporting eggs.

3. In a carrier for eggs, the combination with chains, of a plurality of metal strips each having recesses in its side edge portions and disposed in parallel relation with the recesses of adjacent strips registering to form egg pockets, the strips being secured at their ends to alternate links of the chains and supported by intermediate links.

4. In a carrier for eggs, a plurality of flat strips flexibly secured together in parallel adjacent relation, said strips having a central longitudinal bar portion and a series of spaced integral projections on each side edge thereof forming generally semi-circular recesses between adjacent pairs of projections, the projections of adjacent strips abutting and the recesses of adjacent strips registering to form a continuous flat conveyer bed with spaced generally circular pockets for supporting eggs in upright position.

5. In a carrier for eggs, a plurality of flat plates flexibly secured together in parallel adjacent relation, said plates having recesses in their side edge portions forming egg receiving pockets between the edges of adjacent plates, said pockets having spaced arcuate egg engaging wall portions and intermediate recesses providing passages between the egg and the walls of its receiving pocket and said plates having a longitudinal series of additional openings alternately disposed relative to said egg receiving pockets.

6. In a carrier for eggs, a plurality of flat elongated plates flexibly secured at their ends in parallel substantially abutting relation, each of said plates having a series of spaced cut out portions forming recesses in each longitudinal edge, the recesses of abutting edges registering and forming a series of egg pockets between adjacent plates.

7. In a carrier for eggs, a pair of spaced conveyer chains, a plurality of plates, each plate having cut-away portions forming a series of recesses along each side edge, said plates extending between said chains, and secured at each end to alternate links of one of said chains and disposed in parallel, substantially abutting relation with the recesses of adjoining plates registering to form a substantially continuous flat conveyer bed with a row of spaced egg-supporting pockets between each plate and the adjoining plate on each side thereof.

JOB L. G. MEYER.

CERTIFICATE OF CORRECTION

Patent No. 1,930,621. October 17, 1933.

Job L. G. Meyer.

It is hereby certified that error appears in the printed specification of the above numbered patent requiring correction as follows: In the drawing, Figs. 1 and 2, should appear as shown below instead of as shown in the patent-

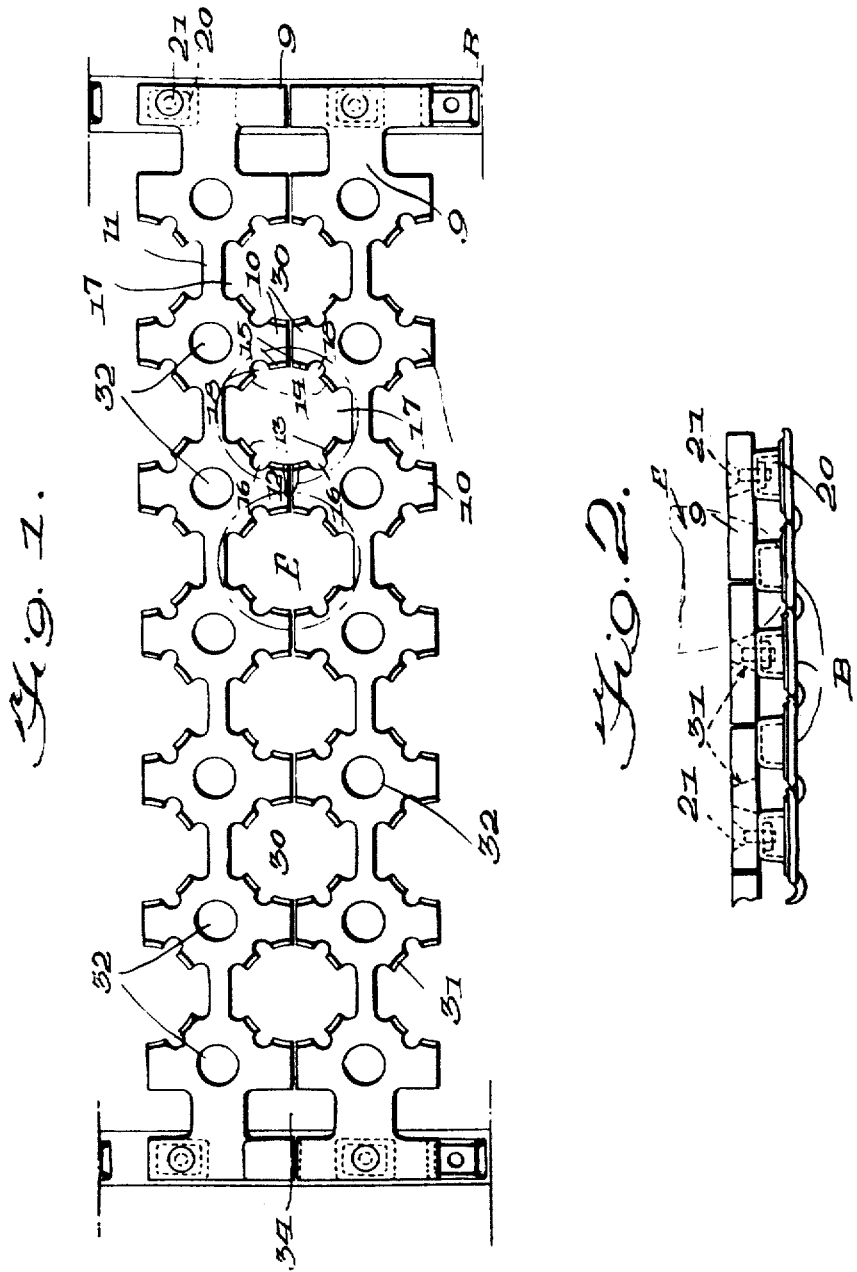

and that the said Letters Patent should be read with this correction therein that the same may conform to the record of the case in the Patent Office.

Signed and sealed this 14th day of November, A.D. 1933.

F. M. Hopkins (Seal) Acting Commissioner of Patents.